: (12) United States Patent
Seo

(10) Patent No.: US 7,875,381 B2
(45) Date of Patent: Jan. 25, 2011

(54) RECHARGEABLE BATTERY AND ITS FABRICATION METHOD

(75) Inventor: Kyungwon Seo, Yongin-si (KR)

(73) Assignee: Samsung SDI Co., Ltd., Gongse-dong, Giheung-gu, Yongin-si, Gyeonggi-do (KR)

( * ) Notice: Subject to any disclaimer, the term of this patent is extended or adjusted under 35 U.S.C. 154(b) by 899 days.

(21) Appl. No.: 11/645,634

(22) Filed: Dec. 27, 2006

(65) Prior Publication Data

US 2007/0154784 A1 Jul. 5, 2007

(30) Foreign Application Priority Data

Dec. 29, 2005 (KR) .................... 10-2005-0134551

(51) Int. Cl.
*H01M 2/24* (2006.01)

(52) U.S. Cl. .................... 429/158; 429/7; 429/62; 429/121; 429/159

(58) Field of Classification Search .................... 429/61
See application file for complete search history.

(56) References Cited

U.S. PATENT DOCUMENTS 5,912,092 A * 6/1999 Maruyama et al. ............ 429/96

2002/0150815 A1 * 10/2002 Ehara .......................... 429/90
2004/0137314 A1 * 7/2004 Fukui .......................... 429/62
2005/0042507 A1 * 2/2005 Kim ........................... 429/161

FOREIGN PATENT DOCUMENTS

| JP | 2000077038 | 3/2000 |
|----|------------|--------|
| JP | 2003157814 | 5/2003 |
| KR | 100490634 | 12/2004 |
| KR | 100515354 | 12/2004 |

* cited by examiner

*Primary Examiner*—Dah-Wei D Yuan
*Assistant Examiner*—Patricia Davis
(74) *Attorney, Agent, or Firm*—Robert E. Bushnell, Esq.

(57) ABSTRACT

A rechargeable battery, which features a simplified assembly process by reducing the number of components includes a bare cell, a body portion which is attached to one side surface of the bare cell and a protective circuit board portion which has two electrical terminals respectively electrically connected to two electrode terminals of the bare cell and formed into one single body by molding. A method of fabrication of the rechargeable battery includes forming a protective circuit board portion into one single body through resin molding, attaching the protective circuit board portion to a bare cell, and respectively electrically connecting two electrical terminals of the protective circuit board portion to two electrodes of the bare cell.

6 Claims, 4 Drawing Sheets

RECHARGEABLE BATTERY AND ITS FABRICATION METHOD

CLAIM OF PRIORITY

This application makes reference to, incorporates the same herein, and claims all benefits accruing under 35 U.S.C. §119 from an application for RECHARGEABLE BATTERY AND METHOD OF MAKING THE SAME earlier filed in the Korean Intellectual Property Office on the 29 Dec. 2005 and there duly assigned Serial No. 10-2005-134551.

BACKGROUND OF THE INVENTION

1. Field of the Invention

The present invention relates to a rechargeable battery, and more particularly, the present invention relates to a rechargeable battery that includes a bare cell having an electrode assembly, a can and a cap assembly, and a protective circuit board electrically connected to the bare cell, and its fabrication method.

2. Description of the Related Art

Since a rechargeable battery is capable of being recharged several times and of realizing a size-reduction and a high capacity, it recently has been actively researched and developed. Among rechargeable batteries, Nickel-Metal Hydride (Ni-MH) batteries, Lithium (Li), and Lithium-ion (Li-ion) batteries have been broadly used.

A bare cell of these rechargeable batteries is fabricated by arranging an electrode assembly including a cathode, an anode and a separator inside a can, covering a top of the can with a cap assembly in which an electrolyte solution is injected into the can before or after covering, and then sealing the can.

A core pack is formed by selectively or associatively connecting a safety device, such as a Positive Temperature Coefficient (PCT) element, a thermal fuse, a Protective Circuit Module (PCM), or other battery components to the sealed bare cell. The exterior of the rechargeable battery is completed by arranging the core pack inside an additional resin case, or filling the gap between the bare cell and the PCM with a hot-melt resin, followed by covering or labeling with a thin exterior material.

The safety device or other components are connected to cathode and anode terminals of the bare cell by a conductive structure called a lead plate. The safety device breaks an electric current, when the battery temperature reaches a high level or the battery voltage is suddenly increased by an overcharge or over-discharge, so as to prevent the battery from breakdowns or fire.

FIGS. 1 and 2 are exploded plane views of one example of a method of fabricating a rechargeable battery.

FIG. 1 illustrates a bare cell 210 having an approximate rectangular shape, an insulation plate 220 on the right-hand side of the bare cell and a protective circuit board portion divided into 3 parts on the right-hand side of the insulation plate. FIG. 2 illustrates a battery assembly 200 when the above components of FIG. 1 are assembled, and upper and lower covers 241 and 243 are respectively arranged on the top and bottom of the battery assembly.

The bare cell 210 is fabricated by arranging an electrode assembly and an electrolyte inside a polygonal can, which has an approximate rectangular parallelepiped shape and an upper opening portion, and covering with a cap assembly which has a cap plate.

An electrode terminal 212 is placed on the cap assembly, which forms an upper surface of the bare cell, and is insulated from the cap plate. The cap plate is welded to the can so as to have the same electrical polarity. Accordingly, when attaching the protective circuit board portion to one side surface of the bare cell 210, the insulation plate 220 is placed for electrical insulation between the protective circuit board portion and the bare cell 210. The insulation plate 220 is made of a double-sided adhesive material so as to attach the protective circuit board portion to the bare cell 210.

The protective circuit board portion includes 3 parts. The protective circuit board portion is positioned on a side surface of the bare cell by arranging a base case 231, which is molded of a resin and is capable of receiving a protective circuit board, on the insulation plate, positioning the protective circuit board formed into a shape corresponding to that of the base case 231, and assembling a cover case 39 having a shape corresponding to the exposed exterior shape of the base case 231 and the protective circuit board positioned thereon.

The protective circuit board is formed by connecting a Protection Circuit Module (PCM) 237 and a PTC element 235 to a PCB substrate 239 and welding nickel plates acting as electrical terminals 232 and 233 to both sides thereof. The two electrical terminals 232 and 233 of the protective circuit board are respectively electrically connected to the electrode terminal 212 formed on the upper portion of the bare cell and a lower surface of the can forming the bare cell. An additional insulation material may be further attached to the electrical terminal 232 to be connected to the electrode terminal 212 for electrically insulating it from the cap plate.

Referring to FIG. 2, upper and lower covers 241 and 243 are respectively attached to the top and bottom of the rechargeable battery assembly 200 formed by assembling the above components of FIG. 1.

Although not shown in the drawings, the exterior of the rechargeable battery may be completed by covering the whole side surface of the core pack of the rechargeable battery with a resin thin film, or covering with a resin thin cover. Furthermore, the core pack may be packed in an additional exterior case in order for an external contact terminal to be exposed. The exterior materials including a covering material, resin cover, exterior case and the like may be applied with or without a label.

However, since every process as described above is performed manually or mechanically, time and cost for performing each process are consumed. Especially, the protective circuit board portion includes a plurality of components, so that great amounts of time and cost are required for assembling thereof.

Furthermore, generally, as the number of processes is increased, the risk of defects occurring in each process is increased.

SUMMARY OF THE INVENTION

Accordingly, an object of the present invention is to provide a rechargeable battery and its fabrication method, which has a reduced number of fabrication processes.

Another object of the present invention is to provide a rechargeable battery and a fabrication method thereof, which can realize cost saving by reducing the number of components used in the assembling process, minimize logistic costs due to a reduced number of components, and reduce processing costs and rejection rate in the assembling process.

Additional advantages, objects and features of the present invention will be set forth in part in the description which follows and in part will become apparent to those having ordinary skill in the art upon examination of the following or may be learned from practice of the present invention.

According to one aspect of the present invention, a rechargeable battery is provided which includes a bare cell and a protective circuit board portion.

The protective circuit board portion may include a body portion attached to the one side surface of the bare cell and two electrical terminals respectively connected to two electrode terminals of the bare cell, and formed in one single body through resin molding that forms a coat layer of the body portion.

The protective circuit board portion may include a PCB substrate with a protection circuit and two electrical terminals extending outside the resin molding from the PCB substrate, in which external electrical terminals are formed on the surface opposed to the contact surface with the bare cell.

According to another aspect of the present invention, a method of fabrication of a rechargeable battery is provided, which includes: forming a protective circuit board portion into one single body through resin molding, attaching the protective circuit board to a bare cell, and respectively electrically connecting two electrical terminals of the protective circuit board portion to two electrodes of the bare cell.

BRIEF DESCRIPTION OF THE DRAWINGS

A more complete appreciation of the present invention and many of the attendant advantages thereof, will be readily apparent as the present invention becomes better understood by reference to the following detailed description when considered in conjunction with the accompanying drawings in which like reference symbols indicate the same or similar components, wherein.

DETAILED DESCRIPTION OF THE INVENTION

Figure 1:
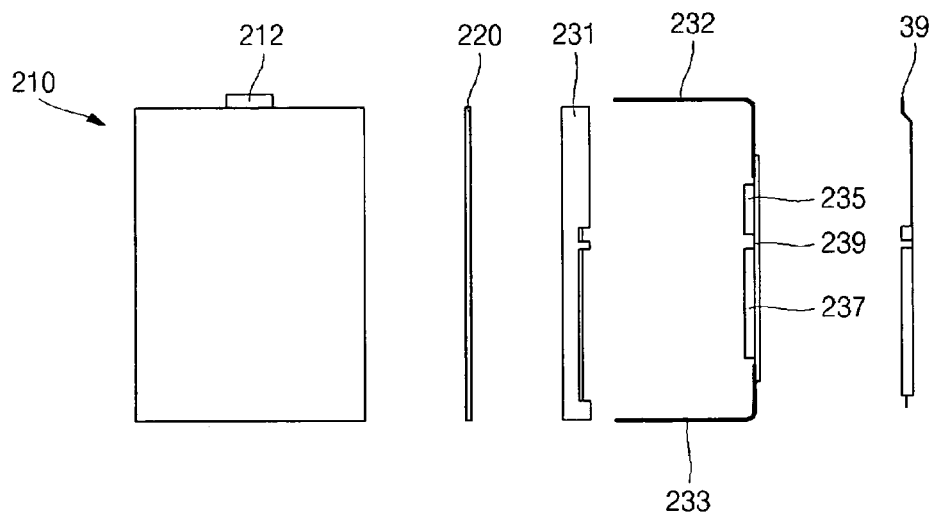
FIGS. 1 and 2 are exploded plane views of one example of a method of fabricating a rechargeable battery.

Hereinafter, exemplary embodiments of the present invention are described in detail below with reference to the accompanying drawing. The aspects and features of the present invention and methods for achieving the aspects and features will be apparent by referring to the embodiments to be described in detail with reference to the accompanying drawings. However, the present invention is not limited to the embodiments disclosed hereinafter, but can be implemented in diverse forms. The matters defined in the description, such as the detailed construction and elements, are merely specific details provided to assist those of ordinary skill in the art in a comprehensive understanding of the present invention, and the present invention is only defined within the scope of the appended claims. In the entire description of the present invention, the same drawing reference numerals are used for the same elements across various figures.

Figure 3:
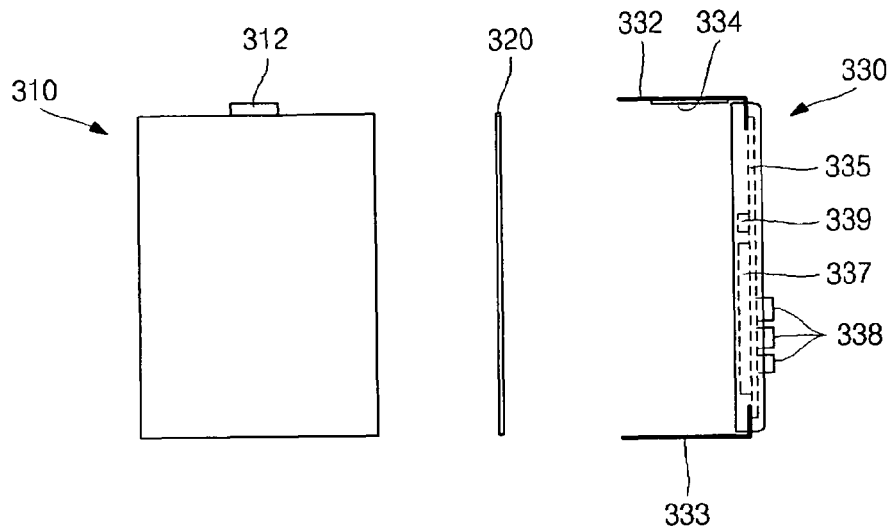
FIG. 3 is an exploded plane view of a bare cell and protective circuit board portion for fabricating a battery core pack according to one embodiment of the present invention.

FIG. 3 is an exploded plane view of a bare cell and protective circuit board portion used for fabricating a battery core pack according to the present invention.

FIG. 3 illustrates components corresponding to those shown in FIG. 1. As shown in FIG. 3, a protective circuit board portion 330 is formed into one single body without distinguishing between the base case 231, the protective circuit board and the cover plate 30 which form the protective circuit board portion of FIG. 1, so that the substrate surface including a PCM 337, a PTC element 330 and other elements is covered with a hot-melt resin. In order to form the protective circuit board portion 330, resin molding is performed by introducing the protective circuit board to the inside of a mold such that two electrical terminals 332 and 333 are formed by being connected to the protective circuit board and then injecting the hot-melt resin. The resin molding forms components into one single body, so that parts forming the protective circuit board are fixed to each corresponding position thereof, and each component is stably attached to a bare cell 310.

The resin molded protective circuit board forms a body portion of the protective circuit board portion. The two electrical terminals 332 and 333 are led out from the body portion, bent on one narrow side surface of the bare cell 310 toward upper and lower surfaces thereof and thus respectively connected to an electrode terminal 312 through the welding between the top end of the bare cell 310 and a lower surface of a can forming the bare cell 310.

The protective circuit board portion 330 may include an external terminal 338 on the surface opposed to the contact surface with the bare cell 310, in which the external terminal 338 is formed to protrude from or be exposed on the surface so as to contact an external device.

FIG. 3 illustrates an insulation plate 320, which insulates the bare cell and the protective circuit board portion, separately from the protective circuit board portion 330, as in FIG. 1. However, the insulation plate 320 may be omitted according to a method of forming the protective circuit board portion 330. In other words, if the entire body portion of the protective circuit board portion 330 is covered with an insulating resin, an insulating material is not necessary. However, the insulation plate is made of a double-sided tape and may act as an adhesive material, because the protective circuit board portion 330 is attached to the bare cell 310.

Figure 4:
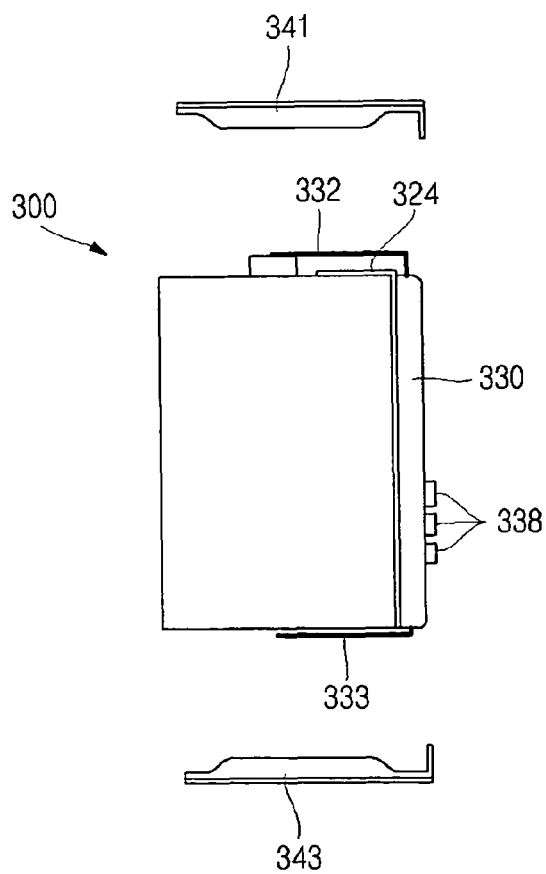
FIGS. 4 and 5 are respectively an exploded plane view of a method of fabricating a rechargeable battery as compared to the method of FIG. 3 and a plane view of a completed rechargeable battery.

Since a cap plate portion of the upper surface of the bare cell 310 except for the electrode terminal 312 causes an electrical short when it is contact with the electrical terminal 332 of the protective circuit board portion 330, a washer or other insulation materials may be required for the inner side surface of the extended electrical terminal 332 or the surface of a cap plate. As shown in FIG. 4, an extended insulation plate 324 is formed by extending the insulation plate 320 of FIG. 3 and may act to insulate the electric terminal of the protective circuit board portion 330 from the cap plate.

Figure 5:
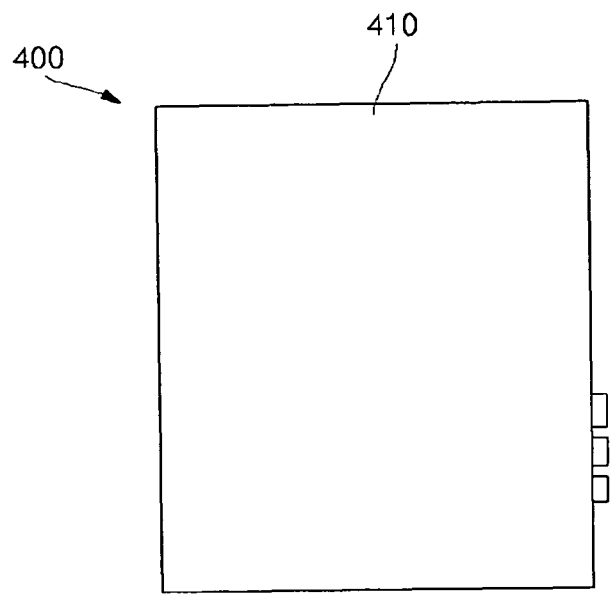

FIGS. 4 and 5 are respectively an exploded plane view of a method of fabricating a rechargeable battery as compared to the method of FIG. 3 and a plane view of a completed rechargeable battery.

Figure 2:
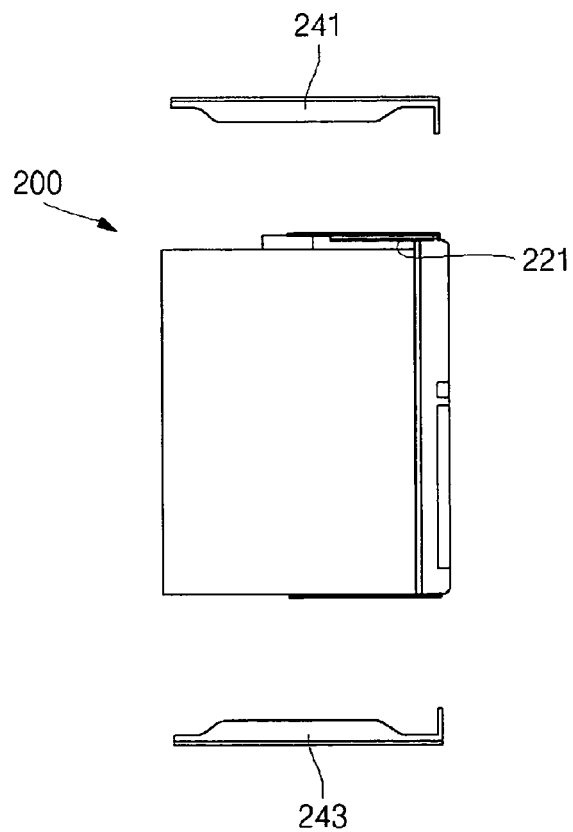

The elements of FIG. 4 are similar to those of FIG. 2. In other words, an upper cover 341 for covering the upper surface of the bare cell in the rechargeable battery 300 and a lower cover 343 for covering the lower surface of the bare cell are respectively connected to the top and bottom of the bare cell.

FIG. 5 shows the exterior of a rechargeable battery 400 completed by covering the rechargeable battery assembly 300 and the protective circuit board portion 330 with an additional resin case 410 in a status of FIG. 4 and connecting them so as to expose only a part on which the external terminal 338 of the protective circuit board portion is formed.

The exterior of the rechargeable battery 400 may be completed by using a tape label as an exterior material rather than the additional resin case 410, in which the tape label covers the wide side surface and upper and lower surface of the rechargeable battery shown in FIG. 4 and is attached thereto. Furthermore, the exterior of the rechargeable battery 400 may be formed by a covering method in which a thermally shrinkable tube is arranged to cover the wide side surface and upper and lower surface of the rechargeable battery of FIG. 4 and is shrunk by applying heat. Additionally, it is possible to remold the rechargeable battery in a status of FIG. 4 with a hot-melt resin in another mold to expose the external terminal of the protective circuit board portion. However, this is disadvantageous in that the prevention circuit is doubly molded.

Figure 6:
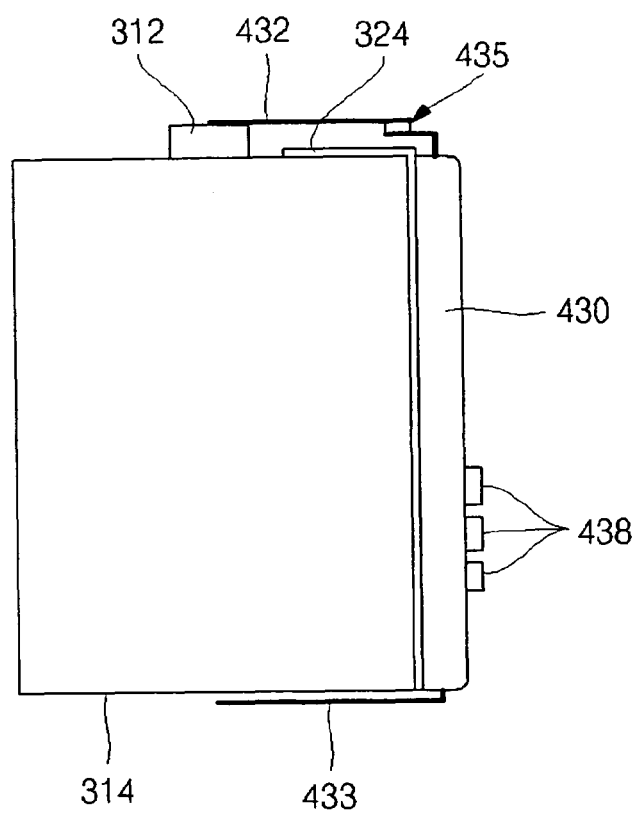
FIG. 6 is a plane view of a battery core pack fabricated according to another embodiment of the present invention.

FIG. 6 is a view of a rechargeable battery assembly according to another embodiment of the present invention.

Referring to FIG. 6, the position of a PTC element is different from that of the rechargeable battery assembly of FIG. 3. More particularly, the PTC element 339 of FIG. 3 is positioned on a substrate 335, and then resin molded to form the protective circuit board portion 330, while a PTC element 435 of FIG. 6 is positioned to be connected to an electrical terminal 432 apart from the resin molded protective circuit board. This arrangement may be used when the PTC element 435 is easily deteriorated in the resin molding process.

According to the present invention, the body portion of the protective circuit board to which major components, such as a PCM, a PTC element, etc., are connected is formed by molding with a hot-melt resin. However, it is different from other methods of forming the protective circuit board in that a plurality of components are formed into one single body and then subjected to an assembly process.

Figure 7:
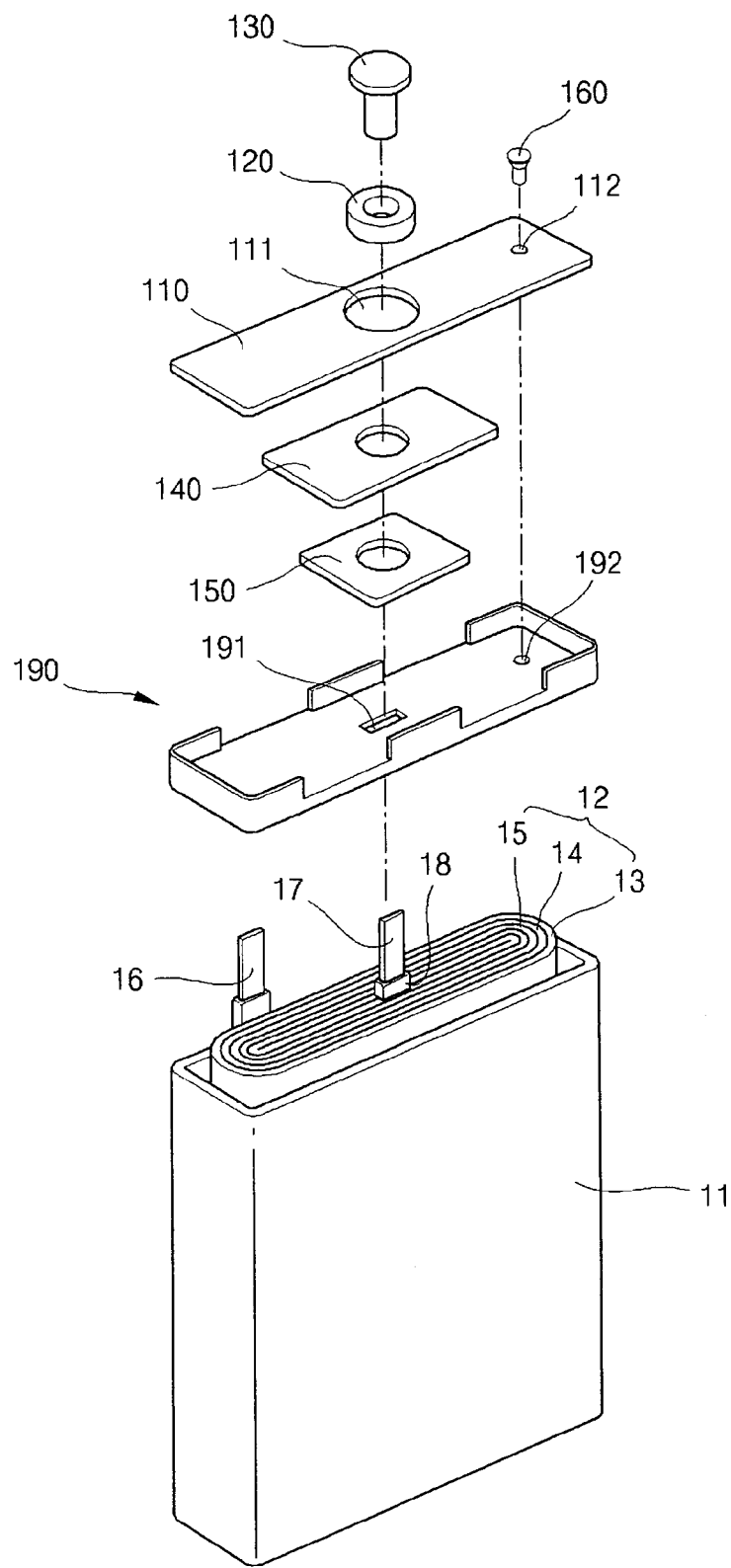
FIG. 7 is an exploded perspective diagram of the structure of a bare cell of a rechargeable battery according to the present invention.

Referring to FIG. 7, a bare cell includes a polygonal can which has an approximate rectangular parallelepiped shape and an upper opening portion, an electrode assembly, and a cap assembly having a cap plate corresponding to the upper opening portion of the can.

The electrode assembly 12, for example, is formed by laminating a cathode 13, a separator 14 and an anode 15, which are formed into a thin plate or film shape, and winding all together into a jelly-roll arrangement. Two sheets of the separator are used in order to prevent an electrical short between the two electrodes.

The cathode 13 includes a cathode collector made of a thin metal sheet, which has an excellent conductivity, such as an aluminum foil, and a cathode active material layer which is formed on both surfaces thereof and uses lithium oxides as a main ingredient. In the cathode 13, a cathode tap 16 is electrically connected to a region of the cathode collector where the cathode active material layer has not been formed.

The anode 15 includes an anode collector made of a thin metal sheet, such as a copper foil, and an anode active material layer which is formed on both surfaces thereof and uses a carbon material as a main ingredient. In the anode 15, an anode tap 17 is electrically connected to a region of the anode collector where the anode active material layer has not been formed. The cathode 13 and the anode 15 may be placed in a different position according to each other's position, and so may the cathode and anode taps 16 and 17.

The separator 14 is made of polyethylene, polypropylene, or a co-polymer thereof, and is wider than the cathode and anode taps 13 and 15 in order to prevent a short circuit between electrode plates.

The can 11 is made of an aluminum alloy, an iron, etc., and receives the electrode assembly 12 through the upper opening thereof so as to act as a container for the electrode assembly 12 and an electrolyte solution. A can 211 is capable of acting as a terminal. However, according to the embodiment, a cap plate 110 of the cap assembly acts as a cathode terminal.

The cap assembly includes the plate type cap plate 110 having a size and shape corresponding to the upper opening of the can 11. A terminal through-hole 111 is formed in a middle portion of the cap plate 110 in order for the electrode terminal to pass through. A tube shaped gasket 120 is positioned on an outer side of the electrode terminal passing through the middle portion of the cap plate 110 in order to connect the electrode terminal 130 to the cap plate 110. An insulation plate 140 is placed on a lower surface of the cap plate 110 around the terminal through-hole 111 of the middle portion of the cap plate 110. A terminal plate 150 is positioned on a lower surface of the insulation plate 140. The anode tap is welded to the terminal plate, while the cathode tap led out from the cathode is welded to the cap plate.

An insulation case 190 is positioned so as to cover the top end of the electrode assembly 12. The insulation case 190 is a polymer resin having insulation properties and has a through-hole 191 in order for the tap to pass through. The through-hole allows an electrolyte solution to pass through without an additional electrolyte solution through-hole 192.

As described above, the rechargeable battery, according to the present invention, produces the following effect.

First, the rechargeable battery can realize a cost saving by reducing the number of components used in the assembling process, and can minimize logistic costs due to a reduced number of components Second, the rechargeable battery can reduce process costs and rejection rate in the assembling process by simplifying the assembling process due to a reduced number of components.

It should be understood by those of ordinary skill in the art that various replacements, modifications and changes in the form and details may be made therein without departing from the spirit and scope of the present invention as defined by the following claims. Therefore, it is to be appreciated that the above described embodiments are for purposes of illustration only and are not to be construed as limitations of the present invention.

What is claimed is:

1. A rechargeable battery, comprising:
   a bare cell having two electrode terminals;
   a protective circuit board portion having a body portion attached to one side surface of the bare cell, further comprising:
      a PCB substrate;
      a Positive Temperature Coefficient (PTC) attached to a side of the PCB substrate facing the bare cell;
      a Protective Circuit Module (PCM) attached to the side of the PCB substrate facing the bare cell; and
      two electrical terminals coupled to the PCB substrate,
      wherein the two electrical terminals are respectively connected to the two electrode terminals of the bare cell and arranged with the protective circuit board portion into one single body.

2. The rechargeable battery of claim 1, wherein the protective circuit board portion is arranged into one single body by molding the surface of the body portion to be connected to the two electrical terminals with a resin.

3. The rechargeable battery of claim 1, wherein the two electrical terminals are respectively connected to upper and lower surfaces of the bare cell, each of a side of the upper surface and a side of the lower surface being respectively connected to a side surface of the bare cell where the body portion is attached.

4. The rechargeable battery of claim 3, further comprising: an electrode terminal which protrudes from and insulated by other parts and is arranged on the upper surface of the bare cell and an insulation material positioned between the electrical terminal connected to the electrode terminal and the other parts of upper surface to prevent an electrical short therebetween.

5. The rechargeable battery of claim 4, wherein the insulation material comprises an extended part of an insulation material arranged between the body portion and the bare cell.

6. The rechargeable battery of claim 1, further comprising an adhesive member to attach the body portion to the bare cell.

* * * * *